June 19, 1923.
W. A. SHIPPERT
MILKING MACHINE
Filed March 6, 1920  2 Sheets-Sheet 1
1,459,420
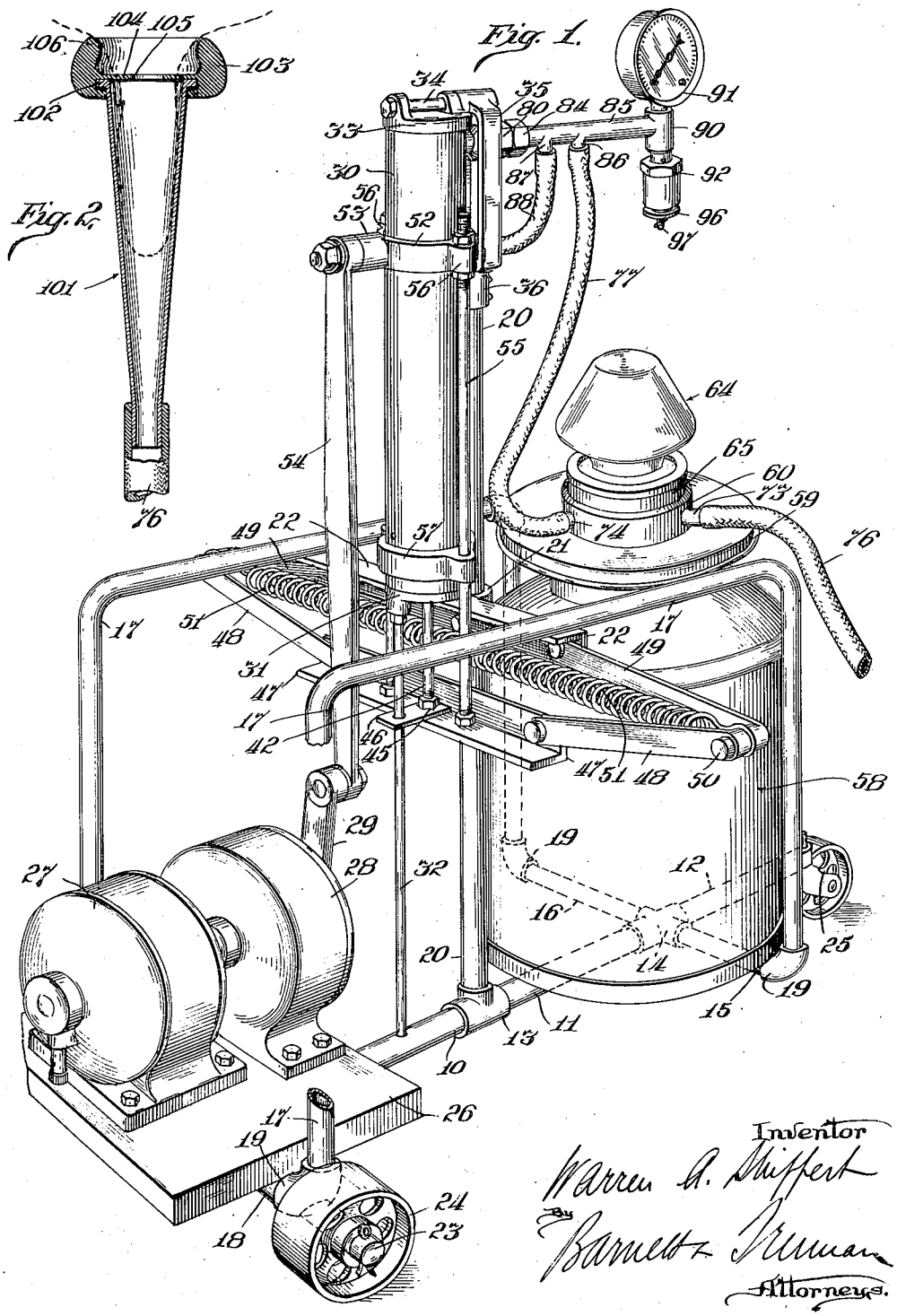

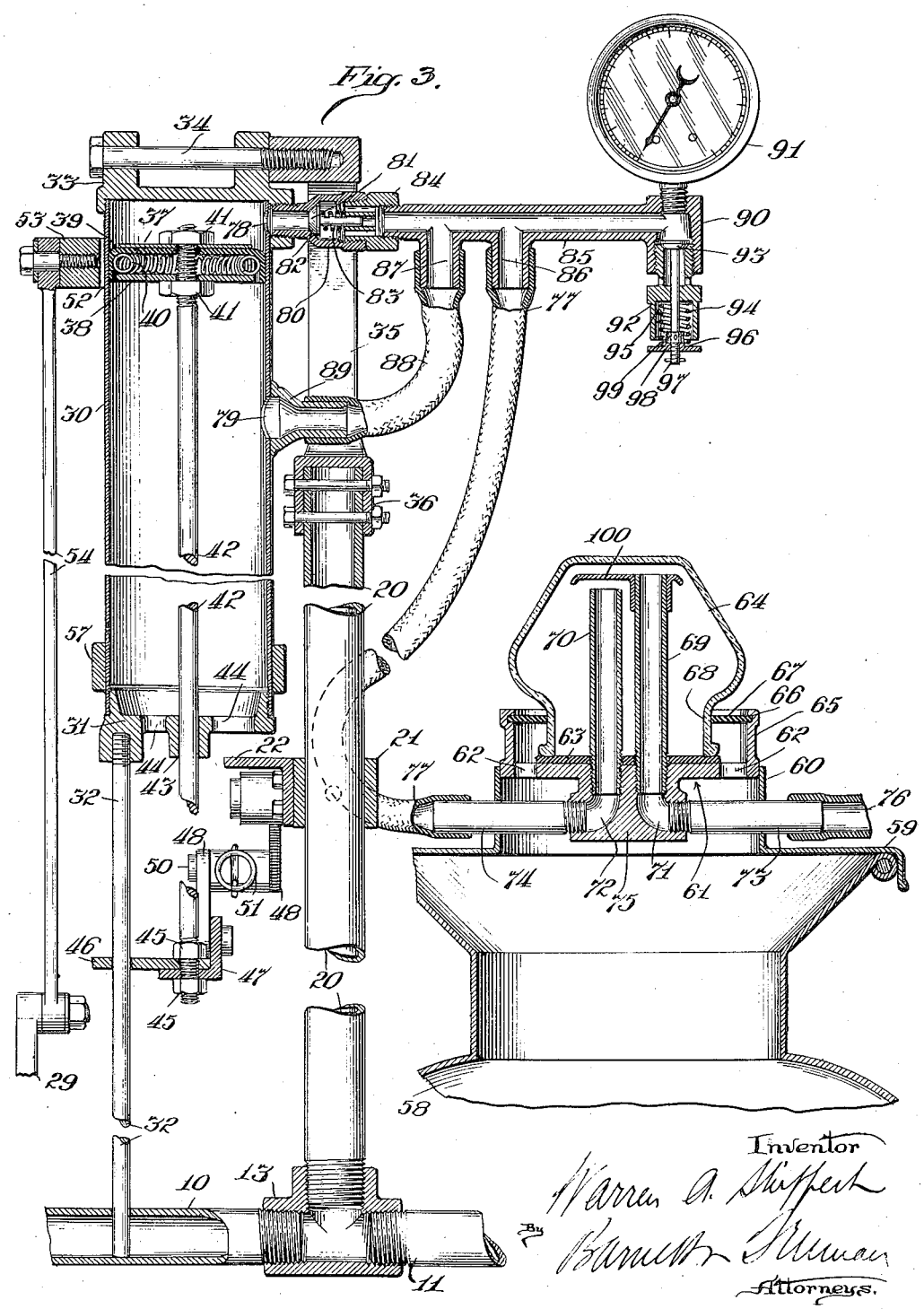

Patented June 19, 1923.

1,459,420

UNITED STATES PATENT OFFICE.

WARREN A. SHIPPERT, OF CHICAGO, ILLINOIS, ASSIGNOR TO THE BURTON PAGE COMPANY, OF CHICAGO, ILLINOIS, A CORPORATION OF ILLINOIS.

MILKING MACHINE.

Application filed March 6, 1920. Serial No. 363,733.

*To all whom it may concern:*

Be it known that I, WARREN A. SHIPPERT, a citizen of the United States, residing at Chicago, in the county of Cook and State of Illinois, have invented certain new and useful Improvements in Milking Machines, of which the following is a specification.

My invention relates to cow milking apparatus, and more especially to a power driven machine, although some of the features of the improvement herein described are adapted for use in connection with a milking machine designed to be operated by hand, and such features are claimed for both types of machine.

The invention has in view specifically a milking machine of the type shown in my Patent 1,264,214 for milking machine, granted April 30, 1918, in which the milk is drawn from the cow into an inverted vessel by the exhaust stroke of an exhausting and pressure pump which on its pressure stroke introduces air into the inverted vessel to raise the same and thereby allow the milk collected therein to discharge. It is one of the objects of the present invention to provide a milk chamber having a novel configuration whereby the milk level, at its highest point, is lower than in the milk chamber of the cylindrical shape shown in my patent above referred to, so that the danger of milk being drawn into the exhaust pipe leading to the pump is minimized, and to accomplish this result without increasing the volumetric contents of the milk chamber. In fact, the invention, in this respect, contemplates a decrease in the volumetric contents of the milk chamber, thereby facilitating the successive intermittent exhausting operations by which the milking of the cow is accomplished.

Another object is to provide certain novel constructions and arrangements in connection with the pump whereby the suction impulses imparted to the cow's udder are neither too strong nor too weak but have just the desired intensity; whereby on the back or pressure stroke of the pump it is supplied with the requisite amount of air for creating pressure enough in the milking chamber to raise the same for discharge of the milk; and whereby the cow is given periods of rest, of some duration, between the intermittent suction impulses.

A further object of the invention is to provide an improved teat cup for a milking machine designed so as to prevent the cup from choking the flow of milk from the teat.

A further object is to provide an inexpensive, compact and readily portable milking machine, of simple and durable construction, in which the milk receptacle, the milk chamber, the pump and the motor for driving the pump are all mounted on a single support or carriage which may be moved from place to place in the cow barn as a unit; the milking apparatus so constructed being superior, so far as concerns economy of construction and convenience of use, to an apparatus involving pumps and driving mechanism installed permanently in the barn and a movable milk chamber and its connections which require attachment to and detachment from the exhausting system at each milking operation. Power is also economized because of the shortening of the pipe lines.

The invention consists in the new and improved constructions, arrangements, devices and combinations of devices to be hereinafter described and claimed for carrying out the above stated objects and such other incidental objects as will be referred to in the following description of the preferred embodiment of the invention shown in the drawings.

In the drawings,

Figure 1 is a view, in perspective, of the entire milking apparatus, except for the teat cups and a portion of the milk pipe connected therewith.

Fig. 2 is a sectional view of my improved form of teat cup, and

Fig. 3 is a vertical sectional view illustrating the principal working parts of the apparatus shown in Fig. 1.

Like characters of reference designate like parts in the several figures of the drawings.

Referring to the drawings, a frame or support is provided for carrying the several parts of the apparatus which frame, for economy of construction, is built up preferably of tubing. The frame comprises a longitudinal member consisting of pipe sections 10, 11, 12, joined together by a T 13 and a cross 14, a transverse member composed of pipe sections 15, 16 united to the cross 14, side frame members 17 bent to provide uprights united to the transverse member 15, 16 and to a similar transverse member 18 by L-unions 19 and an upright member 20, the lower end of which is fitted to the T 13. The upright member 20 has fixed thereto a collar 21 to which is bolted a transverse angle iron brace 22 bearing against the side frame member 17. An axle 23 extends through the transverse frame member 18 and carries rollers 24. The opposite end of the longitudinal frame member is provided with a swiveled caster 25. Secured to the transverse frame member 18 is a platform 26 supporting a motor, preferably an electric motor 27, and the casing 28 of a reduction gear set, this device transmitting relatively slow movement to the crank 29 which operates the exhausting pump. The pump comprises preferably a cylinder 30, the lower head 31 of which is supported on a rod 32 set into the longitudinal frame member 10, the upper head 33 of which is secured by bolt 34 to a yoke 35 having a cap piece 36 bolted to the upper end of the upright frame member 20. Within the cylinder 30 is a piston of any suitable construction. I have shown the piston as consisting of a pair of discs 37, 38, a leather 39, a circular, coiled spring 40 for holding the leather against the cylinder wall, and a pair of clamping nuts 41 for securing the parts above mentioned to the piston rod 42. The lower head 31 of the cylinder has a perforation 43 through which piston rod 42 passes and is formed with openings 44 to the atmosphere. The lower end of the piston rod 42 is clamped by means of nuts 45 to a guide piece 46, which is perforated so as to have a sliding relation with the supporting rod 32, and to an angle iron cross head 47 to the ends of which are pivoted a pair of links 48 united to links 49 by means of studs 50, the links 49 being pivoted at their inner or upper ends to the angle iron cross piece 22 above referred to. A coiled spring 51 is interposed between the articulated ends of the pairs of links 48, 49 and is expanded when the cross head 47 is moved to its upper position, that shown in the drawings. Slidably arranged on cylinder 30 is a ring or sleeve 52 provided with a boss 53 to which is pivoted the upper end of a connecting rod 54, the lower end of which is pivoted to the crank 29. A pair of rods 55 clamped to bosses 56 on the ring extend down through guide openings in a collar 57 fixed to the lower end of the cylinder and are attached to the cross head 47.

The milk can 58, or other milk receptacle, is supported on the longitudinal frame members 11, 12 and transverse frame members 15, 16 and is kept in place by the upright frame member 20 and the side frame members 17. Supported on the milk can is a cap piece 59 having a raised portion 60 into which is fitted a base member 61 formed with milk discharge orifices 62 and provided, preferably, on its upper surface with a facing 63 of rubber or other soft material. The milk chamber 64 which is preferably made of glass, rests upon the soft facing 63 on the base member 61. The base member has an upstanding flange 65 formed with an internal groove 66 into which is set an annular diaphragm 67 of rubber which bears against, but loosely, the neck 68 of the milk chamber. A milk discharge pipe 69 and an air exhaust pipe 70 are set into the base 61 and communicate, respectively, by means of ports 71, 72 formed in the base with pipe sections 73, 74, set into the edge face of a boss 75 on the under side of the base. The pipe section 73 is connected by a piece of flexible tubing 76 with the teat cup cluster, not shown. The pipe section 74 has connected therewith a piece of flexible tubing 77 forming part of the air line connection between the milk chamber and the pump.

The cylinder 30 of the pump is provided with two ports, a port 78 at its upper end and a port 79 at a point intermediate the upper and lower ends of the cylinder but nearer the upper end. Fitted into port 78 is a valve casing 80 in which is arranged a check valve 81 held to its seat 82 by a spring 83. The valve opens outwardly allowing air to escape through port 78 on the pressure stroke of the pump but preventing exhaustion of air through port 78 during the suction stroke of the pump. Screwed into a bonnet 84 in the end of casing 80 is a hollow fitting 85 provided with two nipples 86, 87, the flexible tube 77 being connected with nipple 86 and a flexible tube 88 connecting nipple 87 with a nipple 89 fixed to the cylinder over the lower port 79. The outer end of the hollow fitting 85 is in the form of a T head 90 to the upper end of which is secured a pressure gauge 91. A valve casing 92 is fitted into the lower end of the T. In this valve casing is arranged a check valve 93 held to its seat by a spring 94 bearing against the inner surface of a spring pocket 95 formed on the end of the valve casing and against an adjustable spring seat 96 having a threaded connection with the end of the stem 97 of valve 93. The spring seat has a boss 98 adapted to bear against a collar 99 fixed to the valve stem 97, this arrangement limiting the adjustability of the valve.

The milk pipe 69 and the exhaust pipe 70 preferably project up into the milk chamber 64 almost to the top thereof and the milk pipe is provided with a shield plate 100 which extends over the top of the air pipe. The milk chamber of my Patent 1,264,214 above referred to was substantially cylindrical in shape with a somewhat contracted neck portion. With the chamber so formed, unless the chamber is large (which is undesirable because involving an increased volume of air to be exhausted at each stroke of the pump) there is danger that the milk may rise in the chamber to a point above the end of the exhaust pipe. In accordance with my present invention the milk chamber is shaped so as to keep the level of the milk, at its highest point, at a safe distance below the upper end of the exhaust pipe. This is accomplished by making the chamber of relatively small diameter at the top and of considerably increased diameter further down, as shown in the drawings. By giving the chamber this configuration the high level of the milk will be lower, without increasing the volumetric contents of the chamber. In fact, the chamber may even be made smaller, measured by its volumetric, than with the old form of chamber.

In Figure 2 I have shown an improved form of teat cup. The cup 101 is preferably made of aluminum or other relatively hard substance and is formed at its upper edge with an outstanding rim 102. Over this rim is fitted a soft rubber part 103 provided with a relatively thin diaphragm 104 having an opening 105 therein and with a relatively thick upstanding rim portion 106 designed to bear against the cow's udder. The ordinary teat cup is apt to check the flow of the milk, especially when the teat is large, because of the tendency of the cup to be drawn up against the enlarged portion of the teat by the suction. The rim 106 prevents this.

The operation of the apparatus is as follows: During the first part of the down or suction stroke of the pump piston, that is, until the piston has reached port 79, a vacuum is created in the pump cylinder but as valve 80 closes port 78 there is no exhaustion of air from the milk chamber. During this period, as well as during a portion at least of the period corresponding to the up or pressure stroke of the pump, the cow is rested, that is, not subjected to the milking vacuum. The pump is preferably constructed so that quite an intense vacuum is produced in the cylinder during this period. Therefore there is a very quick exhaustion of the air from the milk chamber, teat cups and their connections as soon as the piston of the pump passes port 79. Preferably the operation is such as to produce at once a vacuum of the maximum milking intensity. The further downward movement of the piston under ordinary conditions would necessarily increase this vacuum above the desired intensity and to prevent that the exhaust system is provided with the air inlet port controlled by valve 93 which valve will open at the intensity of vacuum desired to be maintained during the milking operation. The vacuum may be observed by gauge 91 and the operation of valve 93 regulated through manipulation of the spring seat 96. The pump, in other words, has the capacity to produce a greater vacuum than that required for milking but this vacuum is cut down to the normal by admission of air to the exhaust system. This arrangement insures maintenance of a high enough vacuum at all times besides making it possible to shorten the suction impulses applied to the cow's udder by having such impulses of substantially the same intensity during the first part thereof as during the latter part. Furthermore, the introduction of air into the pump on the suction stroke besides making it certain that on the back or pressure stroke the pump will be able to create enough pressure to lift the chamber 64 and discharge all of the milk therefrom operates on the back stroke to quickly relieve the cow's udder of the suction. In other words, the duration of each suction impulse is shortened or the intervals between suction impulses increased in length. The raising of the milk chamber 64 and the discharge of milk therefrom has to take place before the piston, on its up or pressure stroke, has passed port 79 because with this port back of the piston any pressure created by the further upward movement of the piston will by-pass through pipe 88 instead of being forced through pipe 77. Air is introduced into the pump through the port controlled by valve 93 in sufficient volume so that with the pump piston moving at the same velocity on the back stroke as on the forward stroke, which will, of course, be the case, considerable air pressure will be created, quite sufficient to raise the milk chamber and hold the same raised until the milk is completely discharged, during the first or effective part of the piston's up stroke. The arrangement of the spring 51 which is expanded on the back stroke of the piston and contracts on the forward or vacuum stroke is a preferred but not an essential feature of the invention. The spring tends to balance and thus facilitate the operation of the pump by aiding the motor on the stroke requiring most power and checking the motor during the stroke of the pump which requires less power.

I claim:

1. In a cow milking machine, the combination of a milk chamber comprising an inverted vessel and means for supporting the same, a conduit leading from the cow to the milk chamber, means for alternately exhausting air from and introducing air into the milk chamber, comprising an exhaust conduit which extends into the upper part of the milk chamber; the latter being conformed so as to have a relatively small cross sectional area at the top and a greater cross sectional area at a distance below the upper extremity of said last mentioned conduit.

2. In a cow milking machine, the combination of a milk chamber support and means for sustaining it over a milk receptacle, an exhaust and pressure pump, a pipe connection from the pump which extends through and projects above said support, a pipe connection from the cow which extends through and above said support, and a milk chamber comprising an inverted vessel arranged over said pipes and formed so as to be of maximum cross sectional area at a place below the upper ends of said exhaust and milk pipes and all of smaller cross sectional area above this place.

3. In a cow milking machine, a supporting structure adapted to sustain a milk receptacle, a reciprocating pump carried by said support, a rotating motor on the support having driving connections with the pump, a milk receiving chamber, means for supporting the same over said receptacle, an air pipe connection between the pump and milk chamber, a milk pipe connection from the cow to said milk chamber, and a spring which is stressed on the return stroke of the pump and aids the motor in driving the pump during the vacuum stroke.

4. In a cow milking machine, a supporting structure adapted to sustain a milk receptacle, a pump comprising a cylinder fixed to said supporting structure, a motor on the supporting structure having a crank, a guide ring slidable on said cylinder, a piston and piston rod in said cylinder, a cross head to which the piston rod is secured, said cross head being connected to said ring, means for reciprocating the ring from the crank, a milk receiving chamber, means for supporting the same over said receptacle, an air pipe connection between the pump and milk chamber, and a milk pipe connection from the cow to said milk chamber.

5. In a cow milking machine, the combination of a milk receiving chamber, a pump comprising a cylinder and a piston and piston rod in said cylinder, a cross head to which the piston rod is secured, a guide ring slidable on said cylinder with which the cross head is connected, and a motor for imparting reciprocating movements to said guide ring, a milk pipe connection from the cow to said milk chamber, and an air pipe connection between the pump and milk chamber.

6. In a cow milking machine, the combination of a pump cylinder, a piston and piston rod within said cylinder, a motor provided with a crank, a ring slidably mounted on said cylinder, a connecting rod connecting the ring and crank, a cross head to which the piston rod is connected, rods connecting the cross head with said ring, a milk chamber, a pipe connection leading from the cow to the milk chamber, and a pipe connection between the pump and the milk chamber.

7. In a cow milking machine, the combination of a frame provided with rollers and comprising a bottom portion for supporting a milk can and a motor, side members and an upright member, a motor on said frame, a milk chamber and means for supporting the same over the receptacle, a vertically arranged pump cylinder carried by said upright frame member, a piston and piston rod within said cylinder, a cross head to which the piston rod is connected, a ring slidably arranged on said cylinder, a connecting rod between the ring and motor, rods connecting the cross head with said ring, a pipe connection leading from the cow to the milk chamber, and a pipe connection between the milk chamber and cylinder.

8. In a cow milking machine of the type in which suction impulses are intermittently applied to the cow's udder so as to draw milk therefrom, the combination of means providing a milk receiving space having a valved discharge opening and a conduit leading from the cow to said space, a pump for exhausting air from said space, and means whereby at each milking impulse the creation of vacuum in the pump precedes, by an appreciable period, the commencement of exhaustion of the milk receiving space.

9. In a cow milking machine, the combination of means providing a milk receiving space having a valved discharge opening and a conduit leading from the cow to said space, a reciprocating pump for exhausting air from said space, and means whereby the pump performs a substantial portion of its suction stroke before the exhaustion of the milk receiving space commences.

10. In a cow milking machine, the combination of means providing a milk receiving space having a valved discharge opening, a conduit leading from the cow to said space, a reciprocating pump comprising a cylinder and a piston, and a pipe leading to the milk chamber from the cylinder at a point thereon intermediate the limits of the pump stroke.

11. In a milking machine, the combination of means providing a milk receiving space, a milk conduit leading into said space, and a reciprocating pump for exhausting air from said milk receiving space on one stroke and producing pressure for discharging the milk from said space on the other stroke which is constructed so as to receive air for the creation of such air pressure on its pressure stroke.

12. In a milking machine, the combination of means providing a milk receiving space, a milk conduit leading into said space, a pump for intermittently exhausting air from said space which is capable of producing a more intense vacuum than required for the milking operation, and means for admitting air to said pump and governing the inflow of such air so as to maintain the vacuum at the required milking intensity.

13. In a milking machine, the combination of means providing a milk receiving space, a milk conduit leading into said space, a reciprocating pump for exhausting air from the milk receiving space at one stroke and producing pressure for discharging the milk therefrom on the other stroke, and means for admitting air to said pump and governing the inflow of the air thereto so as to maintain the vacuum in the apparatus at the required milking intensity.

14. In a milking machine, the combination of means providing a milk receiving space, a milk conduit leading into said space, a reciprocating pump for exhausting air from said milk receiving space at one stroke and producing pressure for discharging the milk therefrom at the other stroke comprising a piston and a cylinder, the latter having two ports one at one end of the cylinder and the other intermediate the ends thereof, a conduit communicating with the milk space and having two branches communicating with said ports respectively, and a valve preventing the flow of air through the first named port on the suction stroke of the pump.

15. In a milking machine, the combination of means providing a milk receiving space, a milk conduit leading into said space, a reciprocating pump for exhausting air from said milk receiving space at one stroke and producing pressure for discharging the milk therefrom at the other stroke comprising a piston and a cylinder, the latter having two ports one at one end of the cylinder and the other intermediate the ends thereof, a conduit communicating with the milk space and having two branches communicating with said ports respectively, and a valve preventing the flow of air through the first named port on the suction stroke of the pump, said last named conduit being provided with an air inlet port and a valve to close the same which is opened when a certain vacuum is produced in said conduit.

16. In a milking machine, the combination of means providing a milk receiving space, a milk conduit leading into said space, a reciprocating pump for exhausting air from said milk receiving space at one stroke and producing pressure for discharging the milk therefrom at the other stroke comprising a piston and a cylinder, the latter having two ports one at one end of the cylinder and the other intermediate the ends thereof, a conduit communicating with the milk space and having two branches communicating with said ports respectively, a valve preventing the flow of air through the first named port on the suction stroke of the pump, said last named conduit being provided with an air inlet port and a valve to close the same which is opened when a certain vacuum is produced in said conduit, and means for adjusting said last named valve to vary the vacuum at which the valve opens.

17. In a cow milking machine, the combination of a milk chamber comprising an inverted vessel and a support for the same, a milk conduit leading from the cow to said chamber, a pump comprising a piston and cylinder, the latter having a port at the end thereof in which the piston is found at the beginning of the vacuum stroke of the pump, and a port intermediate the ends of said cylinder, a conduit communicating with the milk chamber having two branches leading to said ports, respectively, and a check valve outwardly opening with respect to the cylinder to close said first named port.

18. In a cow milking machine, the combination of a milk chamber comprising an inverted vessel and a support for the same, a milk conduit leading from the cow to said chamber, a pump comprising a piston and cylinder, the latter having a port at the end thereof in which the piston is found at the beginning of the vacuum stroke of the pump, and a port intermediate the ends of said cylinder, a conduit communicating with the milk chamber having two branches leading to said ports, respectively, a check valve outwardly opening with respect to the cylinder to close said first named port, the last named conduit provided with an air inlet, and a suction opened check valve to close said inlet.

19. In a milking machine, the combination of means providing a milk receiving space, a milk conduit leading to said space, a reciprocating pump for exhausting the air from said space intermittently at alternate strokes, a motor for driving said pump, and a spring which is stressed on each return stroke of the pump.

20. In a milking machine, the combination of means providing a milk receiving space and a reciprocating pump for exhausting air from said space on alternate strokes thereof which is constructed so that at the end of each exhausting stroke air is admitted thereto for the purpose of quickly reestablishing pressure in said space on the return stroke of the pump.

21. In a milking machine, the combination of means providing a milk receiving space and a reciprocating pump for exhausting the air from said space on alternate strokes thereof, and a relief valve adapted to open at the end of each exhausting stroke of the pump to admit air thereto for the purpose of quickly reestablishing pressure in said space on the back stroke of the pump.

22. In a milking machine, the combination of means providing a milk receiving space and a reciprocating pump for exhausting the air from said space on alternate strokes thereof, and a relief valve adapted to open at the end of each exhausting stroke of the pump to admit air thereto for the purpose of quickly reestablishing pressure in said space on the back stroke of the pump, said valve being adjustable to vary the intensity of the vacuum produced by the pump.

WARREN A. SHIPPERT.